United States Patent Office 3,251,905
Patented May 17, 1966

3,251,905
METHOD OF PREPARING BLOCK COPOLYMERS OF CONJUGATED DIENES AND VINYL-SUBSTITUTED AROMATIC COMPOUNDS USING DILITHIO CATALYSTS AND DILUENT MIXTURE OF HYDROCARBON AND ETHER
Robert P. Zelinski, Bartlesville, Okla., assignor to Phillips Petroleum Company, a corporation of Delaware
No Drawing. Filed Aug. 5, 1963, Ser. No. 300,080
3 Claims. (Cl. 260—879)

This is a continuation-in-part of my U.S. patent application Serial No. 796,277 (now abandoned), which was filed on March 2, 1959. This application was filed before abandonment of application Serial No. 796,277. The latter application was a continuation-in-part of U.S. patent application Serial No. 737,213 (now abandoned), which was filed on May 23, 1958.

This invention relates to novel block copolymers of certain conjugated dienes and vinyl-substituted aromatic hydrocarbons, the block copolymers containing at least three polymer blocks or segments. In one aspect, it relates to a process for preparing novel block copolymers of certain conjugated dienes and vinyl-substituted aromatic hydrocarbons.

It is known that various types of polymers can be prepared from different monomeric materials, the particular type formed being generally dependent upon the procedure followed in contacting the materials in the polymerization zone. For example, copolymers, such as a butadiene-styrene copolymer, can be prepared by the simultaneous reaction of the copolymerizable monomers. It is also possible to prepare polymers which are commonly known as graft copolymers. Graft copolymers result from the joining of a comonomer to an already formed polymer at random points along the polymer chain. Still another type of polymer can be obtained by following a procedure known as block polymerization. The polymers, usually referred to as block copolymers, are formed by polymerizing a monomer onto the end of a polymer, the monomer being introduced in such a manner that substantially all of the co-reacting molecules enter the polymer chain at this point. The particular method used in preparing the polymers has a great influence upon the properties of the product obtained. Thus, random copolymers, graft copolymers and block copolymers differ greatly in their properties even though the weight percent of each of the monomeric materials contained in the polymer may be the same in each case.

It is an object of this invention to provide a novel block copolymer of certain conjugated dienes and vinyl-substituted aromatic hydrocarbons, the block copolymer comprising at least three polymeric blocks.

Another object of the invention is to provide a novel and improved process for preparing block copolymers.

A further object of the invention is to provide a catalyst system which makes it possible to prepare in a continuous process block copolymers containing at least three polymeric blocks.

A still further object of the invention is to provide a process whereby the particular type of blocks forming the block copolymers can be varied.

Other and further objects and advantages of the invention will become apparent to those skilled in the art upon consideration of the accompanying disclosure.

The instant invention resides in the discovery of novel block copolymers of certain selected monomers, which are prepared in the presence of particular lithium based catalyst, i.e., organolithium compounds containing two lithium atoms. The block copolymer of this invention comprises at least three polymeric blocks or segments, a central block and two terminal blocks. The central polymeric block is formed of at least one monomer selected from the group consisting of 1,3-butadiene, 2-methyl-1,3-butadiene, 1,3-pentadiene and vinyl-substituted aromatic hydrocarbons. Each of the terminal blocks is formed of at least one monomer selected from the same group with at least one monomer in the terminal blocks being different from at least one monomer in the central block. Each of the terminal blocks contains substantially the same amount of monomer. Block copolymers that are particularly preferred are those containing three polymeric blocks, each of which is a homopolymer of one of the aforementioned monomers. It is to be understood that these block copolymers can contain more than three blocks although the total number of blocks is always an odd number, e.g., five, seven or nine polymeric blocks. However, the block copolymers of this invention can include copolymer blocks and homopolymer blocks or only copolymer blocks.

In one of its aspects, the present invention resides in the discovery of the novel process that makes possible the production of the block copolymers. Broadly speaking, the process of this invention comprises the steps of contacting initially at least one monomer selected from the group consisting of 1,3-butadiene, 2-methyl-1,3-butadiene, 1,3-pentadiene and vinyl-substituted aromatic hydrocarbons with an organolithium compound having the formula $RLi_2$, wherein R is a hydrocarbon radical selected from the group consisting of aliphatic, cycloaliphatic and aromatic radicals, the contacting occurring in the presence of a hydrocarbon diluent selected from the group consisting of aromatic, paraffinic and cycloparaffinic hydrocarbons, so as to form a polymeric block; and, after polymerization of substantially all of the selected monomer, contacting the aforementioned catalyst in the presence of the polymer block initially formed and the hydrocarbon diluent with at least one monomer selected from those included in the aforementioned group, at least one monomer selected being different from at least one monomer employed in the initial contacting. From this description of the process, it should be understood that mixtures of monomers selected from the described group of materials can be used in preparing the block copolymers of this invention. The invention is, in general, applicable to block copolymers containing three or more individual polymer blocks, at least one monomer used in forming a polymer block being different from a monomer used in forming adjacent polymer blocks.

As mentioned hereinabove, the block copolymers that are preferred are those containing three homopolymer blocks. Examples of such block copolymers include the following: a block copolymer formed of a central polybutadiene block and terminal polystyrene blocks; a block copolymer formed of a central polystyrene block and terminal polybutadiene blocks; a block copolymer formed of a central polyisoprene block and terminal polybutadiene blocks; a block copolymer formed of a central polyisoprene block and terminal polystyrene blocks; a block copolymer formed of a central polypiperylene block and terminal polystyrene blocks; and the like. These particular block copolymers are prepared by utilizing the incremental charging procedure of the present process, whereby single monomers are contacted with the dilithio catalyst in the presence of a diluent consisting essentially of hydrocarbons. However, other novel and non-equivalent polymer products can be produced by following the procedures of other embodiments of the present process. Thus, in one embodiment, a conjugated diene, such as 1,3-butadiene, and a vinyl-substituted aromatic hydrocarbon, such as styrene, are charged simultaneously to a reaction zone containing the organolithium catalyst and a hydrocarbon diluent. The polymerization which then occurs results in the formation of a homopolymer of the diene or a copolymer containing at the most a very small number of styrene units. After the polymerization has proceeded until, for example, fifty percent of the diene has been converted, a polar compound, such as described hereinafter, is charged to the reaction zone. Because of the addition of the polar compound, terminal butadiene-styrene copolymer blocks are formed, thereby resulting in a block copolymer product comprising a central polybutadiene block and terminal butadiene-styrene copolymer blocks. After all of the butadiene and styrene have polymerized, if desired, an additional monomer, such as butadiene, can be added to the polymerization zone so as to form a block copolymer containing five polymeric blocks. Thus, the added butadiene polymerizes onto each end of the polymer molecule, i.e., onto the butadiene-styrene copolymer blocks, and the terminal blocks now become polybutadiene blocks.

In another embodiment, a conjugated diene, such as 1,3-butadiene, is charged to a reaction zone containing a solvent mixture comprising a hydrocarbon and a polar compound and the organolithium catalyst. A portion of the butadiene, e.g., 25 weight percent, is allowed to polymerize after which a second monomer, such as a vinyl-substituted aromatic hydrocarbon, is added to the reaction zone. The resulting block copolymer comprises a central homopolymer block of butadiene and terminal copolymer blocks of butadiene and the other monomer, e.g., styrene. Alternatively, a first monomer, such as styrene, can be charged to a reaction zone containing the solvent mixture and the organolithium catalyst and after all of the first monomer has polymerized a mixture of monomers, such as a mixture of butadiene and styrene, can thereafter be added to the reaction zone. The resulting block copolymer comprises a central homopolymer block of styrene and terminal copolymer blocks of butadiene and styrene. In still another embodiment, a mixture of a conjugated diene, such as 1,3-butadiene, and a vinyl-substituted aromatic hydrocarbon, such as styrene, are added to a reaction zone containing a solvent mixture comprising a hydrocarbon and a polar compound. The polymerization is allowed to proceed to 100 percent conversion after which a conjugated diene is introduced into the reaction zone. The resulting block copolymer product comprises a central copolymer block and terminal homopolymer blocks. Alternatively, a mixture of monomers different from the first charge can be used as a second charge so as to give a block copolymer product comprising a central copolymer block and terminal copolymer blocks. It is seen that many modifications of the block copolymer of this invention can be obtained by varying the charge procedure employed in preparing the product.

The organolithium compound used as the catalyst contains two lithium atoms and corresponds to the formula $RLi_2$, wherein R is an aliphatic, cycloaliphatic or aromatic radical. The R in the formula preferably contains from 1 to 20, inclusive, carbon atoms, although it is within the scope of the invention to use higher molecular weight compounds. Examples of suitable compounds include: dilithiomethane, 1,4-dilithiobutane, 1,10-dilithiodecane, 1,20-dilithioeicosane, 1,4-dilithiocyclohexane, 1,4-dilithiobutene-2, 1,8-dilithio-3-decene, 1,4-dilithiobenzene, 1,4-dilithionaphthalene, 1,2 - dilithio-1,2-diphenylethane, 9,10-dilithio - 9,10 - dihydroanthracene, 1,2-dilithio-1,8-diphenyloctane, and the like.

Conjugated dienes that are used in preparing the block copolymers of this invention are 1,3-butadiene, 2-methyl-1,3-butadiene (isoprene) and 1,3-pentadiene (piperylene). The vinyl-substituted aromatic hydrocarbons that can be employed in the practice of this invention can be any vinyl-substituted aromatic hydrocarbon in which the vinyl group is attached to a nuclear carbon atom. It is to be understood that a compound having a substituent on the alpha carbon atom, such as alpha-methylstyrene, is not applicable to the practice of the instant invention. Examples of vinyl-substituted aromatic hydrocarbons that are usually preferred are styrene, 1-vinylnapthalene and 3-methylstyrene (3-vinyltoluene). Examples of other vinyl-substituted aromatic hydrocarbons that can be advantageously utilized include: 3,5-diethylstyrene, 4-n-propylstyrene, 2,4,6 - trimethylstyrene, 4 - dodecylstyrene, 3-methyl-5-n-hexylstyrene, 4-cyclohexylstyrene, 4-phenylstyrene, 2-ethyl-4-benzylstyrene, 4-p-tolylstyrene, 3,5-diphenylstyrene, 2,4,6-tri-tert-butylstyrene, 2,3,4,5 - tetramethylstyrene, 4,5-dimethyl-1-vinylnaphthalene, 3-ethyl-1-vinylnaphthalene, 8-phenyl-1-vinylnaphthalene, 3,6-diethyl-2-vinylnaphthalene, 6 - benzyl-2-vinylnaphthalene, and the like.

The polymerization is carried out in the presence of a hydrocarbon diluent selected from the group consisting of aromatic, paraffinic and cycloparaffinic hydrocarbons. The preferred hydrocarbons of these types are those containing from 3 to 12, inclusive, carbon atoms. Examples of suitable hydrocarbons which can be used include propane, isobutane, n-pentane, isooctane, n-dodecane, cyclopentane, cyclohexane, ethylcyclopentane, dimethylcyclopentane, methylcyclohexane, benzene, toluene, xylene, ethyl benzene, naphthalene, and the like. Mixtures of these various materials can also be employed. It is also within the scope of the invention to employ a polar compound, which does not inactivate the organolithium catalyst in admixture with the hydrocarbon diluent. It has been found that the use of such polar compounds increases the rate at which the monomeric materials are polymerized. Furthermore, as discussed hereinbefore, when utilizing mixture of monomers in preparing the polymeric blocks, the presence of the polar compounds results in the formation of a random copolymer block. Examples of polar compounds which can be advantageously employed are ethers, thioethers (sulfides) and tertiary amines. It is usually preferred to use ethers and sulfides in which the radicals attached to the oxygen or sulfur atoms are hydrocarbon radicals. Specific examples of such polar materials include dimethyl ether, diethyl ether, ethyl methyl ether, ethyl propyl ether, di-n-propyl ether, di-n-octyl ether, anisole, dioxane, 1,2-dimethoxyethane, dibenzyl ether, diphenyl ether, tetramethylene oxide (tetrahydrofuran), dimethyl sulfide, diethyl sulfide, di-n-propyl sulfide, di-n-butyl sulfide, methyl ethyl sulfide, dimethylethylamine, tri-n-propylamine, tri-n-propylamine, tri-n-butylamine, trimethylamine, triethylamine, N,N-dimethylaniline, N-methyl-N-ethylaniline, N-methylmorpholine, and the like. It is to be understood also that mixtures of these polar compounds can be employed in the practice of the present invention. The amount of polar compounds used in admixture with the hydrocarbon diluent is usually in the range of 0.005 to 50 weight percent of the total mixture.

The polymerization process of this invention can be carried out at a temperature within the range of −80 to 150° C. However, it is preferred to carry out the process at a temperature in the range of 30 to 150° C., and more desirably at a temperature in the range of 40 to 120° C. The polymerization reaction can be carried out under autogeneous pressures. It is usually desirable to operate at pressures sufficient to maintain the monomeric materials substantially in the liquid phase. The pressure will thus depend upon the particular materials being polymerized, the diluent being employed, and the temperature at which the polymerization is to be carried out. However, higher pressures can be employed if desired, these pressures being obtained by some such method as the pressurization of the reaction with a gas which is inert with respect to the polymerization reaction.

The amount of catalyst which is used in the preparation of the block copolymers of this invention can vary over a rather wide range. In general, at least 0.15 millimole, e.g., 0.15 to 50 millimoles, of the organolithium compound per 100 parts by weight of the total monomers to be polymerized is employed in the process. The upper limit of the amount of the organolithium compound to be used depends primarily upon the desired inherent viscosity of the polymer resulting from the polymerization. The inherent viscosity of the polymer produced decreases with increasing amounts of the organolithium compound. A preferred catalyst level is from 0.3 to 7.5 millimoles of organolithium per 100 parts by weight of total monomers charged.

The polymerization process of this invention is conducted by initially charging the catalyst components and diluent to a suitable pressure-type reaction zone. In a preferred procedure, the selected monomer (or monomers) to be initially polymerized is then charged to the reaction zone. The polymerization is allowed to proceed until substantially all of this monomer has been polymerized as indicated, for example, by the reduction in pressure which takes place in the reaction zone. After completion of the polymerization of the initial monomer charge, the reaction zone is repressured with another monomer which is different from the monomer originally charged, and the polymerization is again permitted to proceed until substantially all of this latter monomeric material has been polymerized. This procedure can then be repeated with alternating charges of different monomers until a block copolymer of desired composition is obtained. It is necessary either to use up substantially all of each monomer charge before charging another or to remove unpolymerized monomer before the addition of another. Thus, it is to be understood that it is within the scope of the invention to allow the polymerization to proceed until a portion only of one of the monomer charges has been used up after which the remainder of this monomer is removed from the reaction zone. Another monomer is then added to the catalyst and polymer in the reaction zone. When using a conjugated diene as the initial monomer charge, it is usually preferred to employ a monomer other than a conjugated diene as the second charge material. However, a conjugated diene different from the one initially charged can be used as the second charge. When a diluent mixture of a hydrocarbon and a polar compound is used, the foregoing procedure can be modified as described so as to obtain other novel and nonequivalent polymer products.

Various materials are known to inactivate the catalyst composition of the invention. These materials include water, mercaptans, and primary and secondary amines. It is highly desirable, therefore, that the monomers be free of these materials as well as other materials which tend to inactivate the catalyst. Any of the known means of removing such contaminants can be used. Also, it is preferred that the diluent used in the process be substantially free of impurities such as water, oxygen, and the like. In this connection, it is desirable to remove air and moisture from the reaction vessel in which the polymerization is carried out. Although it is preferred to carry out the polymerization under anhydrous or substantially anhydrous conditions, it is to be understood that some water can be tolerated in the reaction mixture. However, the amount of water which may be tolerated in the mixture is insufficient to completely inactivate the catalyst.

After completion of the polymerization reaction, or after the polymerization has been carried out to the desired degree, the total reaction mixture is then treated to inactivate the catalyst and recover the polymer product. While it is to be understood that any suitable treating method can be employed, one method for accomplishing the desired treatment comprises adding a catalyst-inactivating material such as water, an alcohol, e.g., ethyl alcohol or isopropyl alcohol, an organic or inorganic acid, or the like. It is generally preferred to add only an amount of the catalyst-inactivating material which is sufficient to deactivate the catalyst without causing precipitation of the dissolved polymer. It has also been found to be advantageous to add an antioxidant, such as phenyl-beta-naphthylamine, to the polymer solution prior to precipitation of the polymer. After addition of the catalyst-inactivating material and the antioxidant, the polymer present in the solution can then be precipitated by addition of an excess of a material such as ethyl alcohol or isopropyl alcohol. It is to be understood that deactivation of the catalyst and precipitation of the polymer can be accomplished in a single step. The precipitated polymer can then be recovered by filtration, decantation, or the like. In order to purify further the polymer, the separated polymer can then be redissolved in a suitable solvent and again precipitated by the addition of an alcohol. Thereafter, the polymer is again recovered by suitable separation means, as indicated heretofore, and dried. Any suitable hydrocarbon solvent such as hereinbefore mentioned can be used in this purification step to redissolve the polymer. The diluent and alcohol can in all cases be separated, for example, by fractional distillation, and reused in the process. As hereinbefore mentioned, it is within the scope of the invention to utilize an antioxidant in the process to prevent oxidation of polymer. The antioxidant can be added to the reaction mixture prior to precipitation of the polymer, to a solution of redissolved polymer, or to the diluent in which the polymer is to be subsequently redissolved.

A more comprehensive understanding of the invention can be obtained by referring to the following illustrative examples which are not intended, however, to be unduly limitative of the invention.

EXAMPLE I

A run was carried out in which a block copolymer having a central polybutadiene block and terminal polystyrene blocks was prepared by charging to a polymerization bottle, as the initial charge, the following recipe:

| | Parts by weight |
|---|---|
| Butadiene | 100 |
| Cyclohexane [1] | 780 |
| Dilithiostilbene, [2][3] (mmoles) | 3.34 |

[1] Dried over alumina, then by countercurrent nitrogen flow.
[2] 0.175 molar in ether and tetrahydrofuran.
[3] 1,2-dilithio-1,2-diphenylethane.

The cyclohexane solvent was charged to a polymerization bottle, and bubbled with dry nitrogen at the rate of 3 liters per minute for five minutes after which the butadiene was introduced and the catalyst added. Polymerization was allowed to proceed at 50° C. for 2 hours. At this point, a sample (sample A, 48.3 gm.) was removed and treated with alcohol to inactivate the catalyst. To the bottle there was then added 25 parts by weight of styrene. Polymerization was continued for an additional two hours at 50° C., after which alcohol was added to inactivate the catalyst.

The solution of sample A which weighed 48.3 grams represented 23.9 percent of the original charge and, calculated on the basis of butadiene in the charge, should at 100 percent conversion yield 5.4 grams of polymer. On coagulation and recovery of the polymer, 5.4 grams was obtained. Thus, the original polymerization was quantitative. A similar calculation made on the styrene charge indicated that at quantitative conversion, 22.6 grams of block copolymer should be obtained. Coagulation and recovery of the polymer yielded 23.2 grams or slightly more than theoretical, probably a result of a small overcharge of styrene.

Inherent viscosity was measured on the polymer from sample A (polybutadiene) and on the block copolymer. Values were as follows:

| | |
|---|---|
| Inherent viscosity sample A polymer | 0.75 |
| Inherent viscosity block copolymer | 0.84 |

Gel content and swelling index for both polymers were zero.

The foregoing run demonstrates that in both steps of the polymerization, 100 percent conversion was obtained.

Two more runs were made using the same recipe, charging procedure, and polymerization time. At the end of the initial polymerization, 33.3 parts of styrene was added to one bottle, and the polymerization in the other bottle was stopped with alcohol. Polymerization was continued in the bottle to which styrene was added for an additional two hours at 50° C. after which the polymerization was stopped with alcohol. Both polymers were coagulated and recovered. Inherent viscosity of the polybutadiene was 0.79 and that of the block copolymer was 0.82. It is to be noted that these values are essentially identical. Gel content and swelling index were zero.

The polybutadiene was a highly viscous liquid and physical properties were not determined. Evaluation of the block copolymer (uncompounded and uncured), gave the following data:

300% modulus [1] (p.s.i.) _____ 340
Tensile [1] (p.s.i.) _____ 1,080
Elongation [1] (percent) _____ 870

[1] ASTM D412–51T.

These runs show the great difference in properties of the block copolymer as compared to a polybutadiene. The difference in properties is rendered even more unusual by the fact that inherent viscosity values were essentially the same.

Another run was made using the same recipe for the initial polymerization except that 4.67 millimoles of dilithiostilbene was used as the catalyst. After polymerizing at 50° C. for two hours, a portion (sample B, 48.3 grams) was removed and stopped with alcohol. To the polymer solution remaining in the bottle, there was then added 25 parts of styrene. Polymerization was continued for two hours at 50° C. at which point the catalyst was inactivated with alcohol. Inherent viscosity and conversion were determined on sample B and on the block copolymer from the total polymerization. The latter was evaluated in an uncompounded and uncured state and the polystyrene content determined. Data from these determinations are shown below in Table I.

*Table I*

|  | Conversion (percent) | Inherent [2] Viscosity | Modulus [3] (p.s.i.) | Tensile [3] (p.s.i.) | Elongation [3] (p.s.i.) | Styrene Content, Wt. percent [4] |
|---|---|---|---|---|---|---|
| Sample B [1] | 100 | 0.58 | | | | |
| Block copolymer | 102 | 0.65 | 240 | 410 | 570 | 21.5 |

[1] Sample B yielded a polymer which was a viscous liquid and could not be tested for modulus or tensile properties.
[2] Inherent viscosity in this and in the following examples was determined as follows: One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.
[3] ASTM D412–51T.
[4] The styrene content was determined by the ultraviolet method. When using this method, the polymers are first purified to remove antioxidant by either a reprecipitation method or by extraction distillation with an ethanol-toluene azeotrope. After this purification, a sample of the polymer on which the determination is to be made is dissolved in chloroform to form a solution containing 0.2 gram per 100 milliliters of solution. At the same time, a sample of commercial polystyrene is dissolved in chloroform to form a solution containing 0.8 gram per 100 milliliters of solution. The two solutions are then scanned under ultraviolet light over the range between 240 and 330 millimicrons. The actual reading point for styrene content is taken at 262 millimicrons. The amount of styrene present in the block copolymer is then calculated by comparing the peak height of the block copolymer ultraviolet spectrum with the peak height for the polystyrene ultraviolet spectrum, using the specific extinction coefficient which was calculated for the polystyrene sample.

In this run, the inherent viscosity and physical properties reflect the higher catalyst level employed. This run is presented to demonstrate further the unusual properties of the block copolymer and also to show the polystyrene content of the block copolymer product.

EXAMPLE II

A series of runs was carried out in which block copolymers of butadiene and styrene were prepared by initiation with 1,2-dilithio-1,2-diphenylethane, also referred to herein as dilithiostilbene. The dilithiostilbene was prepared by the reaction of trans-stilbene with lithium. Each polymerization run was carried out in a 28-ounce beverage bottle. The diluent and one of the monomers were first charged to the bottle after which the initiator was charged. The dilithiostilbene was charged as a solution in a diethylether-tetrahydrofuran mixture which contained from 10 to 20 weight percent tetrahydrofuran. The bottle was then placed in a bath maintained at the desired polymerization temperature. After the first monomer was completely polymerized, the bottle was removed from the bath, the second monomer was charged, and the bottle was returned to the bath. When the second monomer had completely polymerized, the bottle was removed from the bath, and the polymer was coagulated by pouring the contents of the bottle into isopropyl alcohol. Before coagulation, the polymer solution was admixed with a solution of phenyl-beta-naphthylamine which contained an amount of this antioxidant corresponding to 2 weight percent of the butadiene charge.

The polymerization recipes and the operating conditions used in these runs were as follows:

|  | Parts by Weight, Except as noted | | | | |
|---|---|---|---|---|---|
|  | A | B | C | D | E |
| 1,3-butadiene (Bd) | 90 | 80 | 70 | 75 | 50 |
| Styrene (Sty) | 10 | 20 | 30 | 25 | 50 |
| Cyclohexane | 1,170 | 1,170 | 1,170 | 585 | 1,170 |
| Dilithiostilbene, mmoles | ([1]) | ([1]) | ([1]) | ([1]) | ([1]) |
| Temperature, ° F | 122 | 122 | 122 | 122 | 122 |
| Charge Procedure: | | | | | |
| 1st Monomer | Bd | Bd | Bd | Bd | Bd |
| Polymerization, hours | 1¼ | 1 | 1 | 2 | 1¼ |
| 2nd Monomer | Sty | Sty | Sty | Sty | Sty |
| Polymerization, hours | 2 | 1 | 1½ | 2 | 1¾ |
| Total time, hours | 3¼ | 2 | 2½ | 4 | 2½ |
| Molarity of Initiator solution | 0.18 | 0.175 | 0.18 | 0.175 | 0.18 |

[1] Variable.

The results of these runs are shown hereinbelow in Table II. The block copolymers prepared in these runs were all of the type wherein the central block was a homopolymer of 1,3-butadiene and the two terminal blocks were polystyrene. The figures in the table immediately below each of the run numbers define in weight percent the composition of the block copolymer.

Table II

| Run No. | 1 | 2 | 3 | 4 | 5 |
|---|---|---|---|---|---|
| | 5-90-5 | 10-80-10 | 15-70-15 | 12.5-75-12.5 | 25-50-25 |
| Recipe | A | B | C | D | E |
| Dilithiostilbene, mmoles | 1.80 | 3.75 | 3.75 | 2.5 | 6.5 |
| Conversion, percent | 100 | 100 | 100 | 100 | 99 |
| Mooney, ML-4 [1] | 30 | 33.5 | 42 | | 55 |
| Inherent Viscosity [2] | 1.57 | 0.88 | 0.63 | 0.84 | 0.36 |
| Styrene Content, wt. percent by ultraviolet method [3] | 10.7 | 20.0 | 32.0 | 21.5 | 50.9 |

[1] ASTM D927-55T, Mooney Viscometer, large rotor, 212° F., 4 minutes.
[2] All of these polymers were gel-free.
[3] See Footnote (4) to Table I.

The polymer of Run 1 was separated into fractions by solvent extraction to determine if homogeneous polymers were produced. As used herein, the term "homogeneous polymer" denotes a polymer in which fractions of different molecular weight have substantially the same average bound styrene content.

The procedure followed was to dissolve about 20 grams of the polymer to be analyzed for homogeneity in approximately one and one-half liters of toluene. A finite amount of methyl alcohol was then added so as to cause the precipitation of a portion of the dissolved polymer. After standing for about 24 hours, the precipitated phase was withdrawn and the polymer was recovered from this phase by stripping off the toluene over a hot water bath. The polymer was then dried in a vacuum oven. Each fraction was precipitated and recovered in this manner and then analyzed. The results are set forth in Table III.

Table III

| Sample | Wt. percent of Original | Refractive Index at 25° C. | Inherent Viscosity |
|---|---|---|---|
| Original | 100 | 1.5225 | 1.57 |
| 1 | 24.1 | 1.5210 | 1.75 |
| 2 | 9.2 | 1.5211 | 1.67 |
| 3 | 14.5 | 1.5216 | 1.65 |
| 4 | 13.0 | 1.5217 | 1.52 |
| 5 | 17.0 | 1.5222 | 1.44 |
| 6 | 4.9 | 1.5225 | 1.41 |
| 7 | 1.5 | 1.5231 | 1.33 |
| 8 | 5.3 | 1.5249 | 1.15 |
| Loss | 10.5 | | |

The data in Table II show that the block copolymer of Run 1 was a homogeneous polymer.

The block copolymer of Run 3 was tested in the unvulcanized state to determine its elastic properties. The polymer was pressed into slabs at a temperature between 220 and 260° F. after which tensile bars were cut from the slabs. These bars were then pulled on an Instron tester at a crosshead speed of 20 inches per minute. The results of these tests are shown hereinbelow in Table IV.

Table IV

| | Run 3 |
|---|---|
| Yield Stress, p.s.i.[1] | 230 |
| Approximate elongation at yield point, percent [1] | 30 |
| Maximum or breaking stress, p.s.i.[1] | 1200 |
| Elongation at break, percent [1] | 760 |

[1] ASTM D-412-51T.

The polymer of run 3 was compounded with 0.5 part of dicumyl peroxide per 100 parts of polymer. The compounded polymer was then cured at 307° F. after which the stress-strain properties of the polymer were determined. The results of these tests are set forth hereinbefore in Table V.

Table V

| | Run 3 |
|---|---|
| 300% modulus, p.s.i.[1] | 570 |
| Tensile Strength, p.s.i.[1] | 1320 |
| Elongation, percent [1] | 740 |

[1] ASTM D-412-51T.

EXAMPLE III

A series of runs was carried out in which block copolymers having a high styrene content were prepared and then evaluated as plastics. The procedure employed in carrying out these runs was essentially the same as that described in Example II. These block copolymers were also of the type wherein the central block was a homopolymer of 1,3-butadiene and the terminal blocks were polystyrene. The three numerals shown immediately below the run numbers in Table VI hereinafter represent the weight percent of the polymer blocks contained in the polymer composition. In carrying out the runs, the diluent was charged first after which the butadiene was added. The initiator (dilithiostilbene) was then charged, and the butadiene was polymerized to completion. The styrene was then changed, and after the styrene had all polymerized, the resulting block copolymer was coagulated by discharging the reaction mixture into an excess of isopropyl alcohol. The recipe employed in these runs was as follows.

| | Parts by wt. except as noted |
|---|---|
| Butadiene | Variable |
| Styrene | Variable |
| Cyclohexane | 1170 |
| Dilithiostilbene,[1] mmoles | 0.7 |
| Temperature, °C. | 50 |
| Time, total (hours): | 4 |
| Butadiene | 2 |
| Styrene | 2 |

[1] Charged as an 0.199 M solution in a mixture of diethyl ether and tetrahydrofuran.

The results of these runs are set forth hereinbelow in Table VI. In the runs, 1 percent by weight, based on the butadiene content, of 4,4'-thiobis-(6-tert-butyl-m-cresol) was admixed with the wet crumb after coagulation.

Table VI

| Run No. | 1 | 2 | 3 | 4 | 5 |
|---|---|---|---|---|---|
|  | 37.5-25-37.5 | 40-20-40 | 42.5-15-42.5 | 45-10-45 | 47.5-5-47.5 |
| Parts Butadiene by wt | 25 | 20 | 15 | 10 | 5 |
| Parts Styrene by wt | 75 | 80 | 85 | 90 | 95 |
| Conversion, percent | 98 | 97 | 97.5 | 100 | 100 |
| Inherent Viscosity [1] | 2.28 | 2.70 | 2.24 | 1.95 | 4.58 |
| Tensile Strength, p.s.i. (2) | 1,633 | 2,343 | 3,717 | 5,483 | 3,693 |
| Elongation percent [2] | 17 | 33 | 35 | 2 | 1.9 |
| 300% Modulus, p.s.i.[3] | 58,000 | 106,000 | 180,000 | 268,000 | 382,000 |
| Izod Impact, ft. lb./in. notch [4] | 14.7 | 1.24 | 0.42 | 0.21 | 0.32 |

[1] All of the polymers were gel-free.
[2] ASTM D-412-51T. The sample in Run 5 was pulled at 0.05 inch per minute; all other samples were pulled at 0.5 inch per minute.
[3] ASTM D790-49T.
[4] ASTM D-256-56.

The data in Table VI show that the block copolymers of this invention have a very high green tensile strength.

EXAMPLE IV

A series of runs was carried out in which block copolymers containing a central polybutadiene block and terminal polystyrene blocks were prepared. The recipes used in these runs were as follows:

| Run No. | Parts by Weight, Except as noted | | | | |
|---|---|---|---|---|---|
|  | 1 | 2 | 3 | 4 | 5 |
| Butadiene | 90 | 80 | 70 | 60 | 50 |
| Styrene | 10 | 20 | 30 | 40 | 50 |
| Cyclohexane | 1,170 | 1,170 | 1,170 | 1,170 | 1,170 |
| Dilithiostilbene, millimoles [1] | 2.0 | 2.0 | 2.0 | 2.0 | 2.0 |
| Temperature, °F | 122 | 122 | 122 | 122 | 122 |
| Time (total), hours | 4 | 4 | 4 | 4 | 4 |

[1] 0.199 M in a mixture (90/10 by weight) of diethyl ether/tetrahydrofuran.

The runs were carried out by charging the cyclohexane, butadiene and dilithiostilbene in that order. After the butadiene had polymerized for 2 hours, the styrene was charged and allowed to polymerize for two hours. The results of these runs are shown hereinbelow in Table VII.

Table VII

| Run No. | Conversion, percent | Refractive Index at 25° C. | Inherent Viscosity [1] |
|---|---|---|---|
| 1 | 98.5 | 1.5128 | 1.35 |
| 2 | 98.5 | 1.5285 | 1.18 |
| 3 | 99 | 1.5361 | 1.06 |
| 4 | 97.5 | 1.5430 | 0.94 |
| 5 | 96.5 | 1.5504 | 0.91 |

[1] Gel-free.

The polymers from these runs were formed into tensile bars and pulled to determine their tensile strength. The results of these tests are shown below in Table VIII.

Table VIII

| Run No. | Tensile Strength of Uncompounded Polymer at Test Temperature, p.s.i.[1] | | |
|---|---|---|---|
|  | −1° C. | 25° C. | 60° C. |
| 1 | 580 | 135 | 16 |
| 2 | 1,800 | 560 | 180 |
| 3 | 3,400 | 2,200 | 1,000 |
| 4 | 4,100 | 2,650 | 1,370 |
| 5 | 5,300 | 3,900 | 2,500 |

[1] ASTM D-412-51T.

From the data in Table VIII, it is seen that the block copolymers had a very high green tensile strength which increased with an increase in the styrene content.

EXAMPLE V

Another series of runs was carried out in which block copolymers containing a central polybutadiene or a central copolymer of butadiene and styrene blocks and terminal polystyrene blocks were prepared. In Run 3 shown in Table IX below, sufficient styrene was charged along with the butadiene to form a central block containing 10 parts of styrene for every 70 parts of butadiene. Thus, the final block copolymer contained a central copolymer block comprising a 70/10 butadiene/styrene copolymer and terminal blocks of polystyrene, each containing 10 parts styrene. The recipe employed in these runs was as follows:

Parts by wt. except as noted

Butadiene (Bd) _____ Variable
Styrene (Sty) _____ Variable
Cyclohexane _____ 1170
Dilithiostilbene, millimoles [1] _____ Variable
Temperature, ° C. _____ 50
Time _____ Variable

[1] Charge as an 0.182M solution in a mixture of diethyl ether and tetrahydrofuran except in Run 3, wherein the molarity was 0.178.

In all of these runs, except as noted above for Run 3, the butadiene was charged first and allowed to polymerize after which the styrene was carged. The results of these runs are shown herinbelow in Table IX.

Table IX

| Run No | 1 | 2 | 3 |
|---|---|---|---|
| | 5 Sty-90 Bd-5 Sty | 15 Sty-70 Bd-15 Sty | 10 Sty-(70/10 Bd/Sty)-10 Sty |
| Parts by Wt. Bd | 90 | 70 | 70 |
| Parts by Wt. Sty | 10 | 30 | 30 |
| Dilithiostilbene, mmoles | 1.10 | 3.0 | 3.2 |
| Polymerization Time, hours Bd | 1½ | 1½ | 3 |
| Polymerization Time, hours Sty | 1½ | 1½ | 2 |
| Conversion, percent | 100 | 99.5 | 100 |
| Mooney, ML-4 [1] | 76 | 63 | 72 |
| Inherent viscosity [2] | 2.03 | 0.69 | 0.87 |
| Styrene content by U.V. [3] | 10.2 | | 31.3 |

[1] See appropriate footnote.
[2] Gel-free.
[3] Determined as described in Example II.

The block copolymers prepared in the above runs were compounded and cured. The compounding recipe employed was as follows:

| | Parts by weight |
|---|---|
| Polymer | 100 |
| Filler [1] | 50 |
| Zinc oxide | 3 |
| Stearic acid | 2 |
| Antioxidant [2] | 1 |
| Disproportionated rosin | 3 |
| Sulfur | 2.5 |
| Diphenylguanidine | 1.5 |
| Benzothiazyl disulfide | 0.75 |
| Triethanolamine | 1.0 |

[1] See Table X for specific filler.
[2] Physical mixture containing 65 weight percent of a complex diarylamine-ketone reaction product and 35 weight percent of N,N'-diphenyl-p-phenylenediamine.

The compounded stocks were cured at 307° F. for 45 minutes and the physical properties determined. The results of these runs are shown hereinbelow in Table X.

Table X

| Run No | 1 | | 2 | | 3 | |
|---|---|---|---|---|---|---|
| Mooney ML-4 [3] | 76 | | 63 | | 72 | |
| Filler, phr | [1] 50 | [2] 50 | [1] 50 | [2] 50 | [1] 50 | [2] 50 |
| μ×10⁴ [4] | 2.00 | 2.50 | 1.00 | 1.35 | 1.15 | 1.15 |
| 300% Modulus, p.s.i. [5] | 730 | 900 | 1,480 | 1,610 | 1,340 | 1,330 |
| Tensile, p.s.i. [5] | 970 | 1,180 | 1,950 | 1,990 | 2,140 | 1,960 |
| Elongation, percent [5] | 400 | 410 | 410 | 390 | 470 | 460 |
| Resilience, percent [6] | 77.0 | 72.5 | 51.0 | 49.3 | 58.0 | 68.7 |
| Hysteresis, ΔT, ° F. [7] | 47.3 | 57.5 | 165.3 | 149.1 | 112.9 | 149.0 |

[1] Hard-type, white to cream-colored kaolin mineral filler (aluminum silicate) sold by R. T. Vanderbilt Co. as Dixie Clay.
[2] Hydrated Silica.
[3] See footnote (1) to Table II.
[4] Determined by the swelling method of Kraus as given in Rubber World, October 1946. This value is the number of effective network chains per unit volume of rubber. The higher the number, the more the rubber is crosslinked (vulcanized).
[5] ASTM D412-51T.
[6] ASTM D945-55 (modified). Yerzley oscillograph. Test specimen is a right circular cylinder 0.7 inch in diameter and 1 inch high.
[7] ASTM D623-52T.

EXAMPLE VI

A series of runs was carried out in which block copolymers were prepared and evaluated. The polymerization recipes and the operating conditions used in these runs are as follows:

| | Parts by Weight, Except as Noted | |
|---|---|---|
| | A | B |
| Butadiene (Bd) | 70 | 70 |
| Styrene (Sty) | 30 | 30 |
| Cyclohexane | 1,170 | 1,170 |
| Tetrahydrofuran | 1.4 | 1.4 |
| Dilithiostilbene, millimoles [1] | 3.25 | 3.25 |
| Temperature, ° F | 122 | 122 |
| Time (total), hours | 5 | 5 |
| First Polymerization Charge, Butadiene | 70 | 68 |
| Time, hours | 3 | 3 |
| Second Polymerization Charge | 30 Sty | 2 Bd/30 Sty |
| Time, hours | 2 | 2 |

[1] Charged as 0.218 M solution in mixture of diethyl ether and tetrahydrofuran.

The results of these runs are shown hereinbelow in Table XI.

Table XI

| Run No | 1 | 2 |
|---|---|---|
| Block Polymer, Composition | 15/70/15 | 1/15-68-1/15 |
| | Sty-Bd-Sty | Bd/Sty-Bd-Bd/Sty |
| Recipe | A | B |
| Mooney, ML-4 [1] | 48 | 28 |
| Inherent Viscosity [2] | 0.93 | 0.76 |
| Refractive Index at 25° C | 1.5360 | 1.5366 |
| Molecular Weight [3] | 31,000 | 31,000 |

[1] See appropriate footnote to Table II.
[2] All polymers were gel-free.
[3] Estimated from initiator level.

From the data in Table XI, it is seen that a large change in the ML-4 value resulted from forming the terminal blocks by copolymerizing a small amount of butadiene with the styrene.

The tensile properties of the block copolymers of Runs 1 and 2 were determined on the uncured and uncompounded stocks. These properties are shown hereinbelow in Table XII.

Table XII

| Run No. | 1 | 2 |
|---|---|---|
| 300% Modulus, p.s.i.[1] | 330 | 290 |
| Tensile Strength, p.s.i.[1] | 760 | 670 |
| Elongation, percent [1] | 690 | 730 |
| Elastic Recovery, percent | 97.8 | 97.8 |

[1] ASTM D412-51T.

EXAMPLE VII

Several runs were carried out in which block copolymers of butadiene and styrene were prepared. These block copolymers contained a central block of polystyrene amounting to 75 parts per 100 parts of the polymer and terminal blocks of polybutadiene each containing 12.5 parts per 100 parts of polymer. These runs were carried out in accordance with the following recipes.

| | Parts by weight, except as noted | |
|---|---|---|
| | A | B |
| Butadiene (Bd) | 25 | 10 |
| Styrene (Sty) | 75 | 90 |
| Cyclohexane | 1,170 | 1,170 |
| Dilithiostilbene, millimoles [1] | Variable | Variable |
| Temperature, °C | 50 | 50 |
| Time (total), hours | 6 | 6 |

[1] Charged as an 0.218 M solution in a mixture of diethyl ether and tetrahydrofuran.

In these runs, the styrene was charged first and polymerized for three hours, after which the butadiene was charged and polymerized for three hours. The results of these runs are shown hereinbelow in Table XIII. Physical properties of the polymers are also included in this table.

Table XIII

| Run No. | 1 | 2 | 3 | 4 |
|---|---|---|---|---|
| Recipe | A | A | B | B |
| Dilithiostilbene, millimoles | 0.9 | 0.6 | 0.9 | 0.6 |
| Conversion, percent | 99.5 | 96.5 | 96.7 | 96.5 |
| Inherent Viscosity [1] | 1.55 | 2.80 | 1.42 | 2.34 |
| Physical Properties: | | | | |
| Tensile Strength, p.s.i.[2] | 3,113 | 2,940 | 5,113 | 4,800 |
| Elongation, percent [2] | 3 | 3 | 3 | 4 |
| Flexural Modulus, p.s.i.[3] | 253,000 | 263,000 | 337,000 | 387,000 |
| Impact Strength, ft.-lb./inch Notch [4] | 0.76 | 1.16 | 0.40 | 0.46 |

[1] Gel-free.
[2] Samples prepared according to ASTM D412-51T. Test procedure as described in ASTM D639-52T. Instrom Tester operated at crosshead speed of 0.05 in./min.
[3] ASTM 790-49T.
[4] ASTM D256-56.

The data in Table XIII show that the block copolymers had high green tensile strengths.

The block copolymers produced in accordance with this invention can be rubbery or plastic materials. In general, the polymers have utility in applications where plastic polymers and natural and synthetic rubbers are used. The polymers can be compounded by any of the known methods as have been used in the past for compounding rubbers and plastics. Compounding ingredients, such as fillers, dyes, pigments, curing or cross-linking agents, softeners, reinforcing agents, and the like, can be used in the compounding operation. In manufacturing finished articles, the block copolymers can be molded or extruded. They can be advantageously employed in the manufacture of items such as automobile tires, gaskets, containers, pipe, and the like.

From the foregoing, it is seen that variety of block copolymers can be prepared in accordance with this invention. Thus, the process of this invention makes it possible to tailor a product ranging, e.g., from rubbery to plastic materials, and having a desired set of physical properties. While the block copolymers preferably contain three polymeric blocks or segments, it is within the scope of the invention to prepare polymers having more than three polymer blocks. The block copolymers of this invention are thermoplastic. The block copolymers prepared from butadiene and styrene even in the raw state display the dimensional stability, rubber-like elasticity and the high tensile strength normally associated with reinforced vulcanizates. Thus, a block copolymer having a central polybutadiene block and terminal polystyrene blocks possesses a green tensile strength (tensile strength of uncompounded polymer) of up to 6,000 p.s.i., e.g., a raw tensile strength in the range of 500 to 6,000 p.s.i. The tensile strength of this particular block copolymer (a central polybutadiene block and terminal polystyrene blocks) increases with increased styrene content and with increased molecular weight. The reason for the unexpectedly high green tensile strength of the block copolymer is not completely understood, but it appears that the terminal polystyrene blocks bind the uncured polymer molecules into a network similar to that obtained in block reinforced vulcanizates of random copolymers. In contrast, random copolymers containing a similar amount of butadiene and styrene have very low green tensile strengths. This clearly demonstrates the unobvious nature of the block copolymers of the present invention.

The amount of a particular monomer in a particular homopolymer block, or in the case of a copolymer block, the amount of the monomers forming a particular copolymer block is preferably at least 5 weight percent of the total weight of the block copolymer molecule. It is to be understood that the block copolymers of the present invention may contain the hydrocarbon radical of the organolithium compound used in the polymerization. For example, in a polymerization using dilithiostilbene as a catalyst, the diphenylethylene radical is incorporated in the polymer block which is initially formed.

As will be evident to those skilled in the art, many variations and modifications can be practiced upon consideration of the foregoing disclosure. Such variations and modifications are believed to be within the spirit and scope of the invention.

I claim:

1. A process for preparing block copolymers containing at least three polymer blocks, said process comprising the steps of:

(1) contacting initially at least one monomer selected from the group consisting of 1,3-butadiene, isoprene, piperylene, and monovinyl-substituted aromatic hydrocarbons containing up to 20 carbon atoms per molecule, with an organolithium compound having the formula $RLi_2$ wherein R is a hydrocarbon radical selected from the group consisting of aliphatic, cycloaliphatic and aromatic radicals, said contacting occurring in the presence of a diluent mixture consisting essentially of a hydrocarbon selected from the group consisting of aromatic, paraffinic and cycloparaffinic hydrocarbons, and an ether so as to form a polymer block; and (2) after polymerization of substantially all of the monomer present in step (1), contacting the reaction product of step (1) with at least one monomer selected from the aforementioned group of monomers in the presence of said diluent mixture;

in at least one of steps (1) and (2) a mixture of monomers comprising a conjugated diene and a monovinyl-substituted aromatic hydrocarbon is present and in the other of said steps a single monomer from the aforementioned group consisting of 1,3-butadiene, isoprene and piperylene is present; and (3) recovering a block copolymer having at least one homopolymer block and at least one copolymer block.

2. The process of claim 1 wherein the monomer contacted in step (1) is 1,3-butadiene and the monomers contacted in step (2) are 1,3-butadiene and styrene in admixture.

3. The process of claim 1 wherein the monomers contacted in step (1) are 1,3-butadiene and styrene in admixture and the monomer contacted in step (2) is 1,3-butadiene.

References Cited by the Examiner

UNITED STATES PATENTS

| | | | |
|---|---|---|---|
| 2,181,771 | 11/1939 | Scott | 260—94.2 |
| 2,338,741 | 1/1944 | Soday | 260—880 |
| 2,694,692 | 11/1954 | Amos et al. | 260—880 |
| 2,913,444 | 11/1959 | Diem et al. | 260—94.2 |
| 3,069,380 | 12/1962 | Nozaki | 260—880 |
| 3,070,574 | 12/1962 | Kastning et al. | 260—879 |
| 3,140,278 | 7/1964 | Kuntz | 260—879 |
| 3,149,182 | 9/1964 | Porter | 260—880 |

FOREIGN PATENTS 553,720  6/1957  Belgium.

OTHER REFERENCES

Szwarc et al.: Journal Amer. Chem. Soc., vol. 78, June 1956, pp. 2656–2657.

MURRAY TILLMAN, *Primary Examiner.*

G. F. LESMES, *Assistant Examiner.*